(12) United States Patent
Kishimoto et al.

(10) Patent No.: US 10,449,495 B2
(45) Date of Patent: Oct. 22, 2019

(54) GAS TREATMENT SYSTEM AND GAS TREATMENT METHOD

(71) Applicant: Kobe Steel, Ltd., Hyogo (JP)

(72) Inventors: Akira Kishimoto, Hyogo (JP); Akira Matsuoka, Hyogo (JP); Norihide Maeda, Hyogo (JP); Makoto Nishimura, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 117 days.

(21) Appl. No.: 15/742,467

(22) PCT Filed: Aug. 18, 2016

(86) PCT No.: PCT/JP2016/074066
§ 371 (c)(1),
(2) Date: Jan. 5, 2018

(87) PCT Pub. No.: WO2017/033821
PCT Pub. Date: Mar. 2, 2017

(65) Prior Publication Data
US 2018/0193798 A1    Jul. 12, 2018

(30) Foreign Application Priority Data
Aug. 21, 2015 (JP) ................... 2015-163867

(51) Int. Cl.
*B01D 53/14* (2006.01)
*B01D 53/62* (2006.01)
(Continued)

(52) U.S. Cl.
CPC ......... *B01D 53/96* (2013.01); *B01D 53/1468* (2013.01); *B01D 53/1475* (2013.01);
(Continued)

(58) Field of Classification Search
CPC ............ B01D 53/1468; B01D 53/1475; B01D 53/1481; B01D 53/18; B01D 53/507;
(Continued)

(56) References Cited

U.S. PATENT DOCUMENTS 6,004,380 A * 12/1999 Landreau ............... C10L 3/10
95/174
7,718,151 B1    5/2010 Hu
(Continued)

FOREIGN PATENT DOCUMENTS

JP    2015-024374 A    2/2015

OTHER PUBLICATIONS

Written Opinion issued in PCT/JP2016/074066; dated Sep. 27, 2016.

*Primary Examiner* — Frank M Lawrence, Jr.
(74) *Attorney, Agent, or Firm* — Studebaker & Brackett PC

(57) ABSTRACT

A gas treatment system includes an absorber, a liquid separator, a regenerator, a circulation mechanism and a heat transfer apparatus. The absorber contacts the gas with the treatment liquid. The liquid separator separates the treatment liquid having been in contact with the gas into a first phase portion having a high content of the acidic compound and a second phase portion having a low content of the acidic compound. The regenerator heats the first phase portion to eliminate the acidic compound from the first phase portion. The circulation mechanism recycles the second phase portion and the treatment liquid from which the acidic compound has been eliminated by the regenerator, in the absorber as a treatment liquid with which the gas is to be contacted. The heat transfer apparatus transfers heat from the treatment liquid discharged by the absorber and from the
(Continued)

gas having undergone separation of the acidic compound, to the treatment liquid in the regenerator.

8 Claims, 5 Drawing Sheets

(51) Int. Cl.
*B01D 53/96* (2006.01)
*B01D 53/78* (2006.01)
*B01D 53/50* (2006.01)
*B01D 53/52* (2006.01)
*B01D 53/18* (2006.01)

(52) U.S. Cl.
CPC ......... *B01D 53/1481* (2013.01); *B01D 53/18* (2013.01); *B01D 53/507* (2013.01); *B01D 53/52* (2013.01); *B01D 53/62* (2013.01); *B01D 53/78* (2013.01); *B01D 2252/202* (2013.01); *B01D 2252/204* (2013.01); *B01D 2252/20478* (2013.01); *B01D 2257/304* (2013.01); *B01D 2257/504* (2013.01); *B01D 2258/0283* (2013.01); *Y02C 10/04* (2013.01); *Y02C 10/06* (2013.01); *Y02P 20/152* (2015.11)

(58) Field of Classification Search
CPC ........ B01D 53/52; B01D 53/62; B01D 53/78; B01D 53/96; B01D 2252/202; B01D 2252/204; B01D 2252/20478; B01D 2257/304; B01D 2257/504; B01D 2258/0283; Y02C 10/04; Y02C 10/06; Y02P 20/152

USPC ............ 95/178–180, 183, 206, 236; 96/243; 423/220, 228, 229

See application file for complete search history.

(56) References Cited

U.S. PATENT DOCUMENTS

| | | | |
|---|---|---|---|
| 8,696,798 B2* | 4/2014 | Mak | B01D 53/1425 95/172 |
| 8,974,582 B2* | 3/2015 | Nagayasu | B01D 53/1418 96/188 |
| 10,000,713 B2* | 6/2018 | Mak | C10L 3/104 |
| 2007/0237695 A1 | 10/2007 | Hu | |
| 2009/0263302 A1 | 10/2009 | Hu | |
| 2010/0095851 A1 | 4/2010 | Hu | |
| 2011/0052458 A1 | 3/2011 | Hu | |
| 2011/0079151 A1 | 4/2011 | Ohashi et al. | |
| 2011/0229393 A1 | 9/2011 | Hu | |
| 2013/0055756 A1 | 3/2013 | Tsutsumi et al. | |
| 2013/0260442 A1* | 10/2013 | Vitse | B01D 53/1425 435/266 |
| 2015/0246313 A1* | 9/2015 | Ogawa | B01D 53/1493 423/228 |
| 2015/0298054 A1* | 10/2015 | Muraoka | B01D 53/62 423/228 |
| 2016/0250590 A1* | 9/2016 | Raynal | B01D 53/1425 423/228 |
| 2019/0001259 A1* | 1/2019 | Matsuoka | B01D 53/14 |

* cited by examiner

GAS TREATMENT SYSTEM AND GAS TREATMENT METHOD

TECHNICAL FIELD

The present invention relates to a gas treatment system and a gas treatment method.

BACKGROUND ART

A gas treatment system for separating an acidic compound which generates an acid by dissolution in water from a gas containing the acidic compound such as carbon dioxide or hydrogen sulfide, for example, by using an alkaline treatment liquid such as an aqueous solution of an amine capable of absorbing the acidic compound has been well known (see, for example, Patent Document 1).

The gas treatment system disclosed in Patent Document 1 includes: an absorber for contacting the gas with the treatment liquid; and a regenerator for desorbing the acidic compound by heating the treatment liquid having absorbed the acidic compound such that the treatment liquid restores its ability to absorb the acidic compound.

In such a conventional gas treatment system, the treatment liquid having absorbed the acidic compound is heated to separate the acidic compound therefrom which is then collected, whereas the heated treatment liquid generates water vapor as well as a gas of the acidic compound (may be also referred to as "acidic compound gas". Therefore, in the conventional gas treatment system, only the acid compound gas is collected through cooling the gas generated from the treatment liquid in the regenerator such that the water vapor is condensed, and thus condensed water is allowed to reflux into the regenerator, thereby preventing concentration of the treatment liquid. It is thus required that not only the treatment liquid having absorbed an acidic compound successively supplied to the regenerator, but also the condensed water is subjected to reheating, and consequently the conventional gas treatment system consumes a relatively large amount of energy.

In order to reduce the energy required for heating the treatment liquid having absorbed the acidic compound, the conventional gas treatment system performs heat exchange between the treatment liquid supplied from the absorber into the regenerator and the treatment liquid refluxing from the regenerator into the absorber.

Use of a treatment liquid has been also proposed which is capable of absorbing an acidic compound to undergo separation into a first phase portion having a relatively high content of the acidic compound and a second phase portion having a low content of the acid compound (see, for example, Patent Document 2).

In the gas treatment system disclosed in Patent Document 2, the treatment liquid having absorbed the acidic compound in the absorber is separated into the first phase portion and the second phase portion, and only the first phase portion is introduced to the regenerator, whereby the absolute quantity of the treatment liquid to be heated in the regenerator is reduced, leading to a further reduction in the amount of energy required for regenerating the treatment liquid.

However, the conventional gas treatment system utilizing the treatment liquid that can be separated into the first phase portion and the second phase portion still fails to sufficiently reduce the amount of energy required for separation of the acidic compound, and further energy savings have been awaited.

PRIOR ART DOCUMENTS

Patent Documents

Patent Document 1: Japanese Unexamined Patent Application, Publication No. 2011-98340
Patent Document 2: Japanese Unexamined Patent Application, Publication No. 2012-525253

SUMMARY OF THE INVENTION

Problems to be Solved by the Invention

The present invention was made in view of these disadvantages, and an object of the invention is to provide a gas treatment system and a gas treatment method that enable an acidic compound in a gas to be separated therefrom at a lower energy expenditure.

Means for Solving the Problems

An aspect of the present invention made for solving the aforementioned problems is a gas treatment system for separating an acidic compound which generates an acid by dissolution in water from a gas containing the acidic compound, by using a treatment liquid capable of absorbing the acidic compound to undergo a phase separation. The gas treatment system includes: an absorber for contacting the gas with the treatment liquid; a liquid separator for separating the treatment liquid having been in contact with the gas into a first phase portion having a high content of the acidic compound and a second phase portion having a low content of the acidic compound; a regenerator for heating the first phase portion separated by the liquid separator to eliminate the acidic compound from the first phase portion; a circulation mechanism for recycling the second phase portion separated by the liquid separator and the treatment liquid from which the acidic compound has been eliminated by the regenerator, in the absorber as a treatment liquid with which the gas is to be contacted; and a heat transfer apparatus for transferring heat from the treatment liquid discharged by the absorber and from the gas having undergone separation of the acidic compound, to the treatment liquid in the regenerator.

The gas treatment system includes the heat transfer apparatus for transferring heat from the treatment liquid discharged by the absorber and from the gas having undergone separation of the acidic compound, to the treatment liquid in the regenerator. Thus, the gas treatment system is capable of reducing the thermal energy discarded out of the system, thereby allowing the acidic compound in the gas to be separated at a lower energy expenditure. It is to be noted that the "treatment liquid discharged by the absorber" as referred to herein means the absorption liquid having been discharged by the absorber and is going to be supplied to the regenerator or is going to reflux into the absorber, inclusive of the absorption liquid separated by the liquid separator.

It is preferred that the gas treatment system further includes a water reflux mechanism including: a water vapor separator for separating a gaseous matter generated by the heating in the regenerator, into water vapor and an acidic compound gas; a water vapor compressor for compressing the water vapor separated by the water vapor separator; and a condenser for exchanging heat between the water vapor compressed by the water vapor compressor and the treatment liquid in the regenerator. The water reflux mechanism allows the water condensed by the condenser to reflux into the regenerator. Due to the water reflux mechanism including the water vapor separator, the water vapor compressor and the condenser, the acidic compound gas is separated at a lower energy expenditure, leading to a further reduction in the energy consumption in the gas treatment system.

It is preferred that the circulation mechanism includes a heat exchanger for exchanging heat between the first phase portion separated by the liquid separator and the treatment liquid from which the acidic compound has been eliminated in the regenerator. Due to the circulation mechanism including the heat exchanger for exchanging heat between the first phase portion separated by the liquid separator and the treatment liquid from which the acidic compound has been eliminated in the regenerator, a further reduction in thermal energy required by the regenerator is achieved.

It is preferred that the gas treatment system further includes a gas compressor for compressing the acidic compound gas emitted by the regenerator. The heat exchanger is preferably a three-fluid heat exchanger for exchanging heat between the acidic compound gas compressed by the gas compressor, and both the treatment liquid discharged by the absorber and the first phase portion separated by the liquid separator. The heat exchanger, which is a three-fluid heat exchanger for exchanging heat between the acidic compound gas compressed by the gas compressor, and both the treatment liquid discharged by the absorber and the first phase portion separated by the liquid separator, enables additional heat recovery from the emitted acidic compound gas to take place. This leads to a further reduction in the energy consumption in the gas treatment system.

It is preferred that the heat transfer apparatus transfers heat from the absorption liquid before the absorption liquid is separated by the liquid separator. Due to the heat transfer apparatus transferring heat from the absorption liquid before the absorption liquid is separated by the liquid separator, relatively efficient heat recovery from the absorption liquid is enabled to take place in one spot, and thus, a reduction in the thermal energy required by the regenerator is achieved relatively easily.

It is preferred that the heat transfer apparatus transfers heat from the first phase portion and the second phase portion separated by the liquid separator. Due to the heat transfer apparatus transferring heat from the first phase portion and the second phase portion separated by the liquid separator, a large quantity of the heat of reaction in the absorber is recovered, leading to a further reduction in the thermal energy required by the regenerator.

Another aspect of the present invention made for solving the aforementioned problems is a gas treatment method including: contacting a gas containing an acidic compound which generates an acid by dissolution in water, with a treatment liquid capable of absorbing the acidic compound to undergo a phase separation; separating the treatment liquid having been in contact with the gas into a first phase portion having a high content of the acidic compound and a second phase portion having a low content of the acidic compound; heating the first phase portion to eliminate the acidic compound from the first phase portion; recycling the second phase portion and the treatment liquid from which the acidic compound has been eliminated as a treatment liquid with which the gas is to be contacted in the contacting; and transferring by a heat transfer apparatus heat recovered from the treatment liquid having been in contact with the gas and heat recovered from the gas having undergone separation of the acidic compound, in order to heat the first phase portion.

The gas treatment method includes transferring by the heat transfer apparatus the heat recovered from the treatment liquid having been in contact with the gas and the heat recovered from the gas having undergone separation of the acidic compound, in order to heat the first phase portion, whereby a reduction in the thermal energy to be discarded out of the system is achieved, and the acidic compound in the gas is separated at a lower energy expenditure.

Effects of the Invention

As described above, the gas treatment system and the gas treatment method of the aspects of the present invention allow separation of the acidic compound in the gas to be achieved at a lower energy expenditure.

DESCRIPTION OF EMBODIMENTS

Embodiments of the present invention will be described in detail with appropriate reference to the drawings.

First Embodiment

Figure 1:
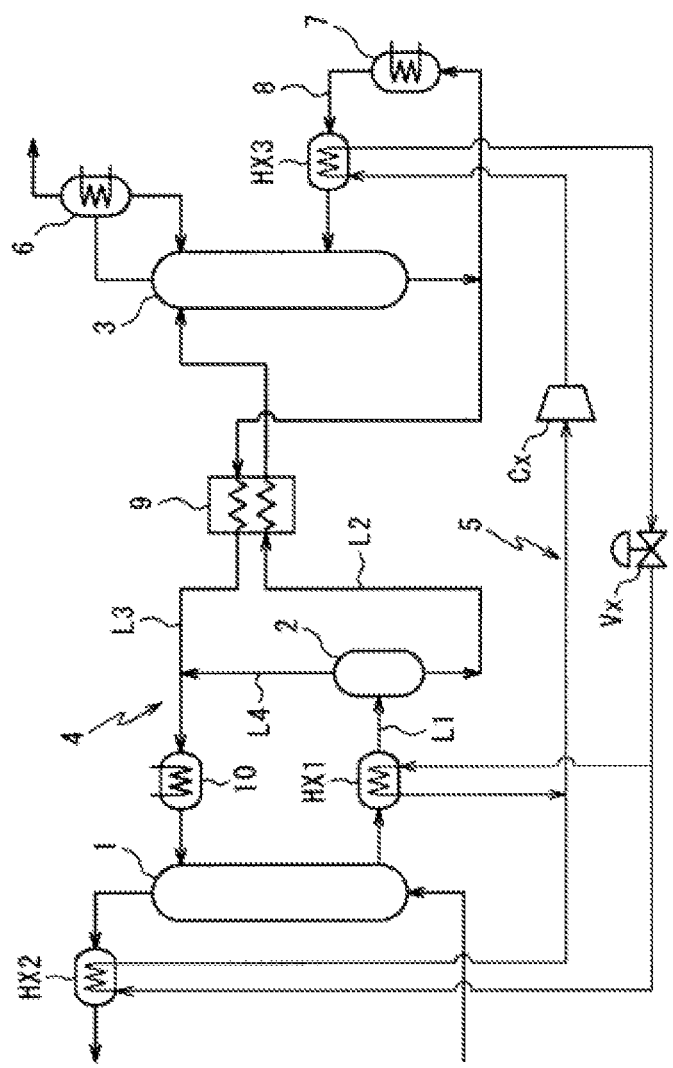
FIG. 1 is a schematic diagram illustrating the configuration of a gas treatment system according to an embodiment of the present invention.

A gas treatment system illustrated in FIG. 1 is for separating an acidic compound which generates an acid by dissolution in water from a gas containing the acidic compound, by using a treatment liquid capable of absorbing the acidic compound to undergo a phase separation.

The gas treatment system includes an absorber 1, a liquid separator 2, a regenerator 3, a circulation mechanism 4 (pipeline) and a heat transfer apparatus 5. The absorber 1 contacts the gas with the treatment liquid. The liquid separator 2 separates the treatment liquid having been in contact with the gas into a first phase portion having a high content of the acidic compound and a second phase portion having a low content of the acidic compound. The regenerator 3 eliminates, by heating, the acidic compound from the first phase portion separated by the liquid separator 2. The circulation mechanism 4 recycles the second phase portion separated by the liquid separator 2 and the treatment liquid from which the acidic compound has been eliminated by the regenerator 3, in the absorber 1 as a treatment liquid with which the gas is to be contacted. The heat transfer apparatus 5 transfers the heat recovered from the treatment liquid discharged by the absorber 1 and the heat recovered from the gas having undergone separation of the acidic compound, in order to heat the treatment liquid in the regenerator 3.

The gas treatment system also includes, together with the regenerator 3: a condenser 6 for condensing water vapor in the gaseous matter generated in the regenerator 3, and allowing the resultant water to reflux into the regenerator 3; and a reboiler 7 for heating the absorption liquid stored in the regenerator 3. The reboiler 7 may be disposed in the regenerator 3 so as to heat the absorption liquid. Alternatively, as illustrated in the drawing, the reboiler 7 may be disposed on a heating flow path 8, with which the absorption liquid is extracted from the regenerator 3, is heated by the reboiler 7 and is subsequently allowed to reflux into the regenerator 3. It is to be noted that a heat exchanger utilizing inexpensive cooling water such as river water may be used as the condenser 6. The reboiler 7 may heat the absorption liquid directly or indirectly by using a freely selected heat source such as, for example, electricity, water vapor, a burner, or the like.

Acidic Compound

The acidic compound to be separated in the gas treatment system is not particularly limited as long as an acidic aqueous solution is obtained, and the acidic compound may be exemplified by hydrogen chloride, carbon dioxide, sulfur dioxide, carbon disulfide, and the like.

Absorption Liquid

The absorption liquid to be used in the gas treatment system is exemplified by an alkaline absorption liquid containing water, an amine compound and an organic solvent.

Examples of the amine compound include 1,3-diaminopropane (DMA), 2-aminoethanol (MEA), DL-2-amino-1-propanol (AP), 2-(2-aminoethoxy)ethanol (AEE), 2-(methylamino)ethanol (MEA), 2-(ethylamino)ethanol (EAE), 2-(butylamino)ethanol (BAE), (R)-4-amino-2-methyl-1-butanol (AMB), and the like.

Examples of the organic solvent include 1-butanol, 1-pentanol, octanol, diethylene glycol diethyl ether (DEGDEE), diethylene glycol dimethyl ether (DEGDME), and the like.

Gas

The gas to be treated in the gas treatment system is exemplified by industrial waste gas, natural gas, hydrogen gas, and the like. Thus, the gas treatment system may be used to eliminate hazardous substances from the gas which will be discharged into the air, or to eliminate impurities in the gas which will be used as, for example, a fuel.

Absorber

The absorber 1 contacts the gas with the absorption liquid such that the acidic compound in the gas is absorbed by the absorption liquid, and the absorber 1 discharges the gas after the removal of the acidic compound.

The absorber 1 may be any apparatus as long as it is capable of continuously contacting the gas with the absorption liquid. For example, the absorber 1 may be used which sprays the absorption liquid into the flow path of the gas, or causes the absorption liquid to flow down through a filler disposed in the flow path of the gas. Furthermore, the absorber 1 may be used which introduces the gas into a large number of fine flow paths and introduces the absorption liquid into a large number of fine flow paths, followed by merging of the fine flow paths of the gas with the fine flow paths of the absorption liquid.

An exothermic reaction participates in the absorbing of the acid compound in the absorber 1. In the case where the acidic compound is carbon dioxide, the heating value per ton of absorbed carbon oxide is about 1.8 GJ. The heat of reaction generated in the absorber 1 leads to rise in temperatures of the gas and the absorption liquid.

Liquid Separator

The liquid separator 2 may be any apparatus as long as it accelerates the phase separation of the absorption liquid to two-liquid separate the absorption liquid into the first phase portion having a high content of the acidic compound and a second phase portion having a low content of the acidic compound. The liquid separator 2 may be, for example, a container in which the absorption liquid is separated by gravity, an apparatus for centrifugal separation of the absorption liquid, and the like.

Regenerator

The regenerator 3 stores the absorption liquid, and the absorption liquid stored is heated by the reboiler 7, whereby acidic substances are desorbed from the absorption liquid, and water in the absorption liquid is evaporated and discharged. An endothermic reaction participates in the desorbing of the acidic substance, and the amount of heat absorbed per ton of discharged carbon dioxide is about 1.8 GJ/t-$CO_2$, which is equal to the amount of heat generated in the absorber 1.

The regenerator 3 discharges carbon dioxide and water vapor at a temperature equal to the temperature of the absorption liquid in the generator 3 (e.g., 120° C.). Then, the condenser 6 condenses the water vapor and allows the resultant water to reflux into the regenerator 3. Thus, it is necessary to reheat the low-temperature condensed water (e.g., 45° C.) to the temperature of the absorption liquid in the regenerator 3. Latent heat of vaporization and sensible heat corresponding to a difference in temperature between the condensed water and the absorption liquid in the regenerator 3 are discarded by the condenser 6, and both the amount of heat equivalent to the discarded heat and the amount of heat generated in the endothermic reaction become load on the reboiler 7. The amount of heat discarded by the condenser 6 is about 1.45 GJ/t-$CO_2$ per ton of discharged carbon dioxide.

Thus, in the gas treatment system without the heat transfer apparatus 5, i.e., in the conventional gas treatment system, an energy of about 3.25 GJ/t-$CO_2$ per ton of discharged carbon dioxide is consumed in the reboiler 7.

Circulation Mechanism

The circulation mechanism 4 includes a first flow path L1, a second flow path L2, a third flow path L3, and a fourth flow path L4. Through the first flow path L1, the absorption liquid is extracted from the absorber 1 and the extracted absorption liquid is supplied to the liquid separator 2. Through the second flow path L2, the first phase portion separated by the liquid separator 2 is supplied to the regenerator 3. Through the third flow path L3, the treatment liquid is allowed to reflux from the regenerator 3 into the absorber 1. Through the fourth flow path L4, the second phase portion separated by the liquid separator 2 is introduced to the third flow path L3 such that the second phase portion is allowed to reflux into the absorber 1.

The circulation mechanism 4 also includes a main heat exchanger 9, which is disposed so as to extend over the second flow path L2 and the third flow path L3 and exchanges heat between the first phase portion separated by the liquid separator 2 and the treatment liquid from which the acidic compound has been eliminated in the regenerator 3. A well-known component such as, for example, a plate heat exchanger may be used as the main heat exchanger 9. When a microchannel heat exchanger capable of exchanging heat between fluids with a relatively small difference in temperature is used as the main heat exchanger 9, an improvement in energy efficiency can be achieved.

Furthermore, the circulation mechanism 4 includes an absorption liquid cooler 10, which is disposed downstream of the point at which the fourth flow path L4 is connected to the third flow path L3 (is disposed close to the absorber 1), for cooling the treatment liquid passing therethrough. It is to be noted that a heat exchanger utilizing inexpensive cooling water such as, for example, river water may be used as the absorption liquid cooler 10.

Heat Transfer Apparatus

As the heat transfer apparatus 5, a well-known apparatus may be used which is exemplified by: a vapor-compression heat pump for transferring heat by evaporation and condensation of a heating medium; a magnetic heat pump for transferring heat by using a refrigerant capable of generating and absorbing heat in accordance with thermal flux changes; a semiconductor heat pump for transferring heat by utilizing the Pertier effect, and the like.

Specifically, the heat transfer apparatus 5 may be a vapor-compression heat pump including a liquid recovery heat exchanger HX1, a gas recovery heat exchanger HX2, an output heat exchanger HX3, a heating medium compressor Cx, and an expansion valve Vx. The liquid recovery heat exchanger HX1 is disposed on the first flow path L1 so as to be closer to the absorber 1 than the liquid separator 2 is, and allows the heating medium to recover heat from the treatment liquid discharged by the absorber 1 before the treatment liquid is separated by the liquid separator 2. The gas recovery heat exchanger HX2 allows the heating medium to recover heat from the gas having undergone separation of the acidic compound, i.e., the treated gas discharged by the absorber 1. The output heat exchanger HX3 is disposed downstream of the reboiler 7 on the heating flow path 8, and heats the absorption liquid stored in the regenerator 3 and containing the first phase portion, by using the heating medium. The heating medium compressor Cx compresses the heating medium having recovered heat in the liquid recovery heat exchanger HX1 and the gas recovery heat exchanger HX2. The expansion valve Vx decompresses the heating medium having emitted heat in the output heat exchanger HX3.

With heat recovery performed in the liquid recovery exchanger HX1, the temperature of the absorption liquid flowing from the absorber 1 is 60° C., and the temperature of the absorption liquid at the outlet of the liquid recovery exchanger HX1 is 45° C. (the minimum temperature difference caused by the heat exchange is 10° C.).

With heat recovery performed in the gas recovery heat exchanger HX2, the temperature of the gas introduced to the absorber 1 is 45° C., the temperature of the gas flowing from the absorber 1 (treated gas) is 55° C., and the temperature of the gas at the outlet of the gas recovery heat exchanger HX2 is 45° C. (the minimum temperature difference caused by heat exchange is 10° C.).

The amount of heat to be transferred to the absorption liquid in the regenerator 3 by the output heat exchanger HX3 is approximately equal to the sum of the amount of heat recovered by the liquid recovery heat exchanger HX1 and the amount of heat recovered by the gas recovery heat exchanger HX2, and is about 1.8 GJ/t-$CO_2$ per ton of absorbed carbon dioxide.

On the other hand, the amount of energy consumed by the heating medium compressor Cx is about 0.6 GJ/t-$CO_2$ per ton of absorbed carbon dioxide.

Thus, the energy which may be consumed by the gas treatment system including the heat transfer apparatus 5 can be reduced by about 1.2 GJ/t-$CO_2$ per ton of absorbed carbon dioxide, as compared to the energy which may be consumed by the conventional gas treatment system.

A well-known component such as, for example, plate heat exchangers may be used as the liquid recovery heat exchanger HX1, the gas recovery heat exchanger HX2 and the output heat exchanger HX3 of the heat transfer apparatus 5. When a microchannel heat exchanger capable of exchanging heat between fluids with a relatively small difference in temperature is used, a further improvement in energy efficiency can be achieved.

In a case where the minimum temperature difference caused by heat exchange in each of the liquid recovery heat exchanger HX1, the gas recovery heat exchanger HX2 and the output heat exchanger HX3 is 3° C., the amount of energy consumed by the gas treatment system illustrated in FIG. 1 is reduced by about 1.3 GJ/t-$CO_2$ per ton of absorbed carbon as compared to the amount of energy consumed by the conventional gas treatment system.

Gas Treatment Method

A gas treatment method according to another embodiment of the present invention is for separating an acidic compound which generates an acid by dissolution in water from a gas containing the acidic compound, by using a treatment liquid capable of absorbing the acidic compound to undergo a phase separation, and the gas treatment method may be implemented through the use of the gas treatment apparatus illustrated in FIG. 1.

The gas treatment method includes: contacting, by the absorber 1, a gas containing an acidic compound which generates an acid by dissolution in water, with a treatment liquid capable of absorbing the acidic compound to undergo a phase separation; separating, by the liquid separator 2, the treatment liquid having been in contact with the gas into a first phase portion having a high content of the acidic compound and a second phase portion having a low content of the acidic compound; heating, by the generator 3, the first phase portion to eliminate the acidic compound from the first phase portion; and recycling the second phase portion and the treatment liquid from which the acidic compound has been eliminated, in the absorber 1 as a treatment liquid with which the gas is to be contacted in the contacting. The method also includes transferring by the heat transfer apparatus 5 heat recovered from the treatment liquid having been in contact with the gas and heat recovered from the gas having undergone separation of the acidic compound, in order to heat the first phase portion.

Advantages

The gas treatment system and the gas treatment method according to the embodiments of the present invention allow a reduction in the thermal energy discarded out of the system to be achieved since heat is transferred from the treatment liquid having been in contact with the gas and from the treatment liquid having undergone separation of the acidic compound, to the treatment liquid in the regenerator 3. Thus, the acidic compound in the gas can be separated at a lower energy expenditure.

In the gas treatment system, the circulation mechanism 4 includes the main heat exchanger 9, which exchanges heat between the first phase portion of the absorption liquid separated by the liquid separator 2 and the treatment liquid from which the acidic compound has been eliminated in the regenerator 3. This leads to a reduction in thermal energy required by the regenerator 3 (reboiler 7) to heat the treatment liquid supplied through the second flow path L2 to the temperature of the inside of the regenerator 3.

In the gas treatment system, the heat transfer apparatus 5 recovers heat in the liquid recovery heat exchanger HX1 from the absorber 1 rather than the main heat exchanger 9. Thus, relatively efficient heat recovery from the absorption liquid heated in the regenerator 3 is achieved, leading to a further reduction in the thermal energy required by the regenerator 3.

In the gas treatment system, the heat transfer apparatus 5 recovers heat in the liquid recovery heat exchanger HX1 from the absorber 1 rather than the liquid separator 2. Thus, relatively efficient reuse of the heat of reaction in the absorber 1 is achieved, leading to a further reduction in the thermal energy required by the reboiler 7.

Second Embodiment

Figure 2:
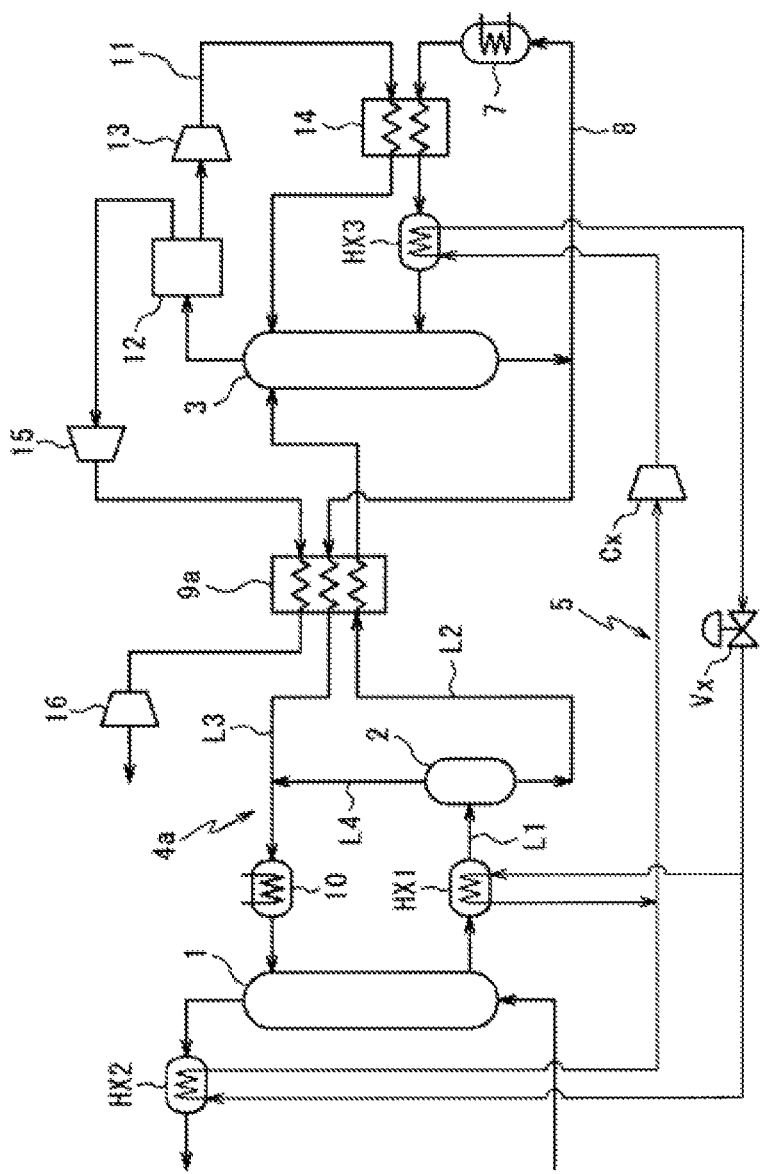
FIG. 2 is a schematic diagram illustrating the configuration of a gas treatment system according to an embodiment of the present invention distinct from the gas treatment system illustrated in FIG. 1.

A gas treatment system illustrated in FIG. 2 is for separating an acidic compound which generates an acid by dissolution in water from a gas containing an acidic compound, by using a treatment liquid capable of absorbing the acidic compound to undergo a phase separation.

The gas treatment system includes the absorber 1, the liquid separator 2, the regenerator 3, a circulation mechanism 4a and the heat transfer apparatus 5. The absorber 1 contacts the gas with the treatment liquid. The liquid separator 2 separates the treatment liquid into the first phase portion having a high content of the acidic compound and the second phase portion having a low content of the acidic compound. The regenerator 3 eliminates, by heating, the acidic compound from the first phase portion separated by the liquid separator 2. The circulation mechanism 4a recycles the second phase portion separated by the liquid separator 2 and the treatment liquid from which the acidic compound has been eliminated by the regenerator 3, in the absorber 1 as a treatment liquid with which the gas is to be contacted. The heat transfer apparatus 5 transfers heat from the treatment liquid discharged by the absorber 1 and from the gas having undergone separation of the acidic compound, to the treatment liquid in the regenerator 3.

The gas treatment system also includes: a water reflux mechanism 11 for condensing water vapor in the gaseous matter generated by the heating in the regenerator 3, and allowing the resultant water to reflux into the regenerator 3; and the heating flow path 8 provided with the reboiler 7 for heating the absorption liquid stored in the regenerator 3.

The water reflux mechanism 11 includes a water vapor separator 12, a water vapor compressor 13 and a condenser 14. The water vapor separator 12 separates the gaseous matter generated in the regenerator 3 into water vapor and an acidic compound gas. The water vapor compressor 13 compresses the water vapor separated by the water vapor separator 12. The condenser 14 exchanges heat between the water vapor compressed by the water vapor compressor 13 and the treatment liquid in the regenerator 3 (the heating flow path 8), and allows the resultant water to reflux into the regenerator 3.

The gas treatment system also includes: a gas compressor 15 for compressing the acidic compound gas emitted by the regenerator 3 and separated by the water vapor separator 12; and an expander 16 for converting the expansive power of the acidic compound gas into rotational energy.

The configurations of the absorber 1, the liquid separator 2, the regenerator 3, the heat transfer apparatus 5 and the reboiler 7 of the gas treatment system illustrated in FIG. 2 are identical to the configurations of the absorber 1, the liquid separator 2, the regenerator 3, the heat transfer apparatus 5 and the reboiler 7 of the gas treatment system illustrated in FIG. 1. Thus, the constituent elements of the gas treatment system illustrated in FIG. 2 which are equivalent to those of the constituent elements of the gas treatment system illustrated in FIG. 1 are denoted by the same reference signs, and the description thereof will not be repeated. The acidic compound, the absorption liquid and the gas to be used in the gas treatment system illustrated in FIG. 2 may be identical to the acidic compound, the absorption liquid and the gas to be used in the gas treatment system illustrated in FIG. 1.

Circulation Mechanism

The circulation mechanism 4a of the gas treatment system includes the first flow path L1, the second flow path L2, the third flow path L3, and the fourth flow path L4. Through the first flow path L1, the absorption liquid is extracted from the absorber 1 and the extracted absorption liquid is supplied to the liquid separator 2. Through the second flow path L2, the first phase portion separated by the liquid separator 2 is supplied to the regenerator 3. Through the third flow path L3, the treatment liquid is allowed to reflux from the regenerator 3 into the absorber 1. Through the fourth flow path L4, the second phase portion separated by the liquid separator 2 is introduced to the third flow path L3 such that the second phase portion is allowed to reflux into the absorber 1.

The circulation mechanism 4a extends over the second flow path L2 and the third flow path L3, and allows heat to be exchanged between the first phase portion separated by the liquid separator 2 and the treatment liquid from which the acidic compound has been eliminated in the regenerator 3. The circulation mechanism 4a includes a main heat exchanger 9a, which is a three-fluid heat exchanger, to allow heat to be also exchanged between the first phase portion separated by the liquid separator 2 and the acidic compound gas compressed by the gas compressor 15.

Furthermore, the circulation mechanism 4a includes the absorption liquid cooler 10, which is disposed downstream of the point at which the fourth flow path L4 is connected to the third flow path L3 (is disposed close to the absorber 1), for cooling the treatment liquid passing therethrough.

Water Vapor Separator

The water vapor separator 12 condenses water vapor in the gaseous matter generated in the regenerator 3 by adiabatic expansion, thereby separating the gaseous matter into water and the acidic compound. Subsequently, the water vapor separator 12 applies heat generated by adiabatic expansion to the thus separated water and acidic compound. The condensed water accordingly evaporates into water vapor again.

Water Vapor Compressor

The water vapor compressor 13 compresses water vapor decompressed in the water vapor separator 12, and increases pressure to a level that permits reflux into the regenerator 3. The temperature of the water vapor having undergone adiabatic compression in the water vapor compressor 13 is higher than the temperature of the absorption liquid in the regenerator 3.

Condenser

The condenser 14 condenses water vapor by transferring sensible heat and latent heat of water vapor having undergone adiabatic compression in the water vapor compressor 13 to the absorption liquid in the heating flow path 8, whereby the water vapor is condensed into liquid water pressured enough for reflux into the regenerator 3.

In the gas treatment system, the main heat exchanger 9a utilizes the thermal energy of the acidic compound gas emitted by the regenerator 3 for heating the first phase portion of the absorption liquid, and the expander 16 recovers the thermal energy as power energy for use in the gas compressor 15 and the like.

Advantages

Owing to the water reflux mechanism including the water vapor separator 12, the water vapor compressor 13 and the condenser 14, the gas treatment system allows most of the thermal energy of water vapor generated by the heating in the generator 3 to reflux into the regenerator 3. Thus, the gas treatment system allows the acidic compound gas to be separated at a lower energy expenditure.

Since the main heat exchanger 9a of the gas treatment system is a three-fluid heat exchanger, additional heat recovery is enabled to take place, whereby heat is transferred from the emitted acidic compound gas to the absorption liquid supplied to the regenerator 3 through the second flow path L2. Thus, a further reduction in energy consumption is achieved.

Third Embodiment

Figure 3:
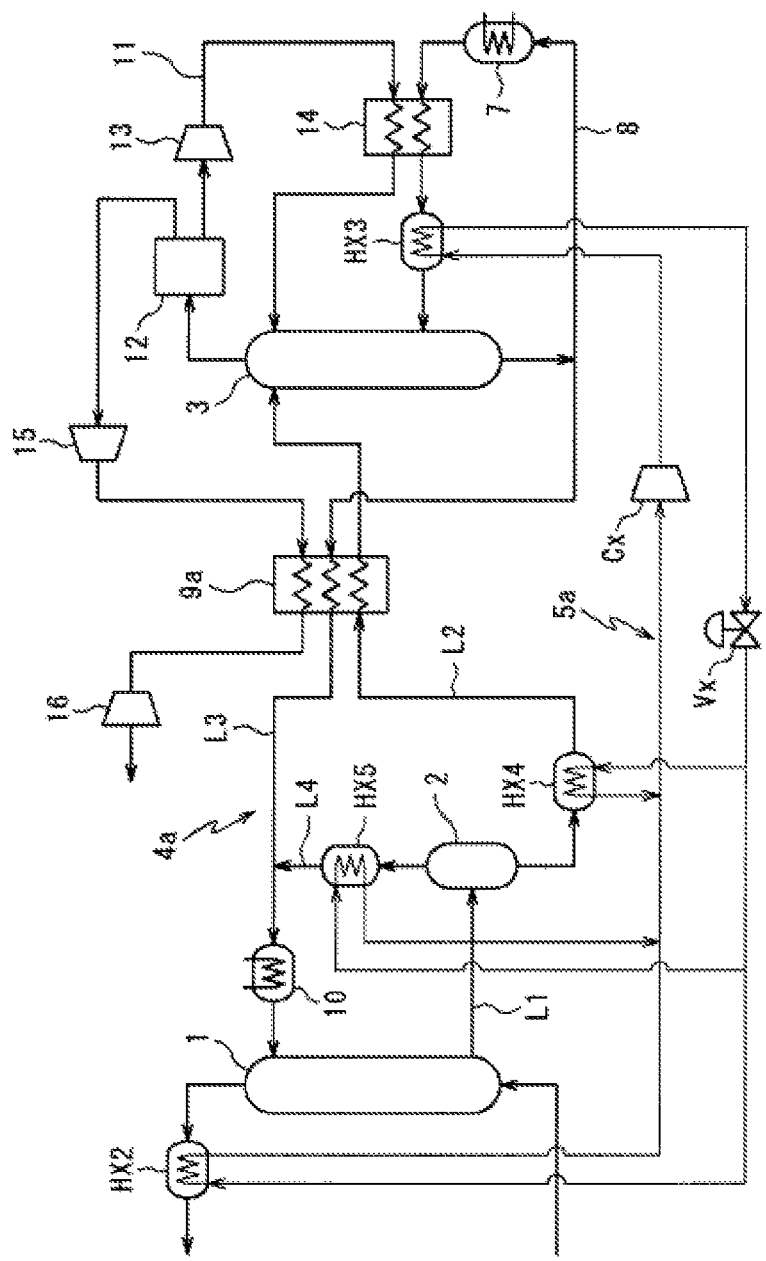
FIG. 3 is a schematic diagram illustrating the configuration of a gas treatment system according to an embodiment of the present invention distinct from the gas treatment systems illustrated in FIGS. 1 and 2.

A gas treatment system illustrated in FIG. 3 is for separating an acidic compound which generates an acid by dissolution in water from a gas containing the acidic compound, by using a treatment liquid capable of absorbing the acidic compound to undergo a phase separation.

The gas treatment system includes the absorber 1, the liquid separator 2, the regenerator 3, the circulation mechanism 4a and a heat transfer apparatus 5a. The absorber 1 contacts the gas with the treatment liquid. The liquid separator 2 separates the treatment liquid into the first phase portion having a high content of the acidic compound and the second phase portion having a low content of the acidic compound. The regenerator 3 eliminates, by heating, the acidic compound from the first phase portion separated by the liquid separator 2. The circulation mechanism 4a recycles the second phase portion separated by the liquid separator 2 and the treatment liquid from which the acidic compound has been eliminated by the regenerator 3, in the absorber 1 as a treatment liquid with which the gas is to be contacted. The heat transfer apparatus 5a transfers heat from the treatment liquid discharged by the absorber 1 and from the gas having undergone separation of the acidic compound, to the treatment liquid in the regenerator 3.

The gas treatment system also includes: the water reflux mechanism 11 for condensing water vapor in the gaseous matter generated by the heating in the regenerator 3, and allowing the resultant water to reflux into the regenerator 3; and the heating flow path 8 provided with the reboiler 7 for heating the absorption liquid stored in the regenerator 3.

The water reflux mechanism 11 includes the water vapor separator 12, the water vapor compressor 13 and the condenser 14. The water vapor separator 12 separates the gaseous matter generated in the regenerator 3 into water vapor and an acidic compound gas. The water vapor compressor 13 compresses the water vapor separated by the water vapor separator 12. The condenser 14 exchanges heat between the water vapor compressed by the water vapor compressor 13 and the treatment liquid in the regenerator 3 (the heating flow path 8), and allows the resultant water to reflux into the regenerator 3.

The gas treatment system also includes: the gas compressor 15 for compressing the acidic compound gas emitted by the regenerator 3 and separated by the water vapor separator 12; and the expander 16 for converting the expansive power of the acidic compound gas into rotational energy.

The configurations of the absorber 1, the liquid separator 2, the regenerator 3, the circulation mechanism 4a, the reboiler 7, the water reflux mechanism 11, the gas compressor 15 and the expander 16 of the gas treatment system illustrated in FIG. 3 are identical to the configurations of the absorber 1, the liquid separator 2, the regenerator 3, the circulation mechanism 4a, the reboiler 7, the water reflux mechanism 11, the gas compressor 15 and the expander 16 of the gas treatment system illustrated in FIG. 2. Thus, the constituent elements of the gas treatment system illustrated in FIG. 3 which are equivalent to those of the constituent elements of the gas treatment system illustrated in FIG. 2 are denoted by the same reference signs, and the description thereof will not be repeated. The acidic compound, the absorption liquid and the gas to be used in the gas treatment system illustrated in FIG. 3 may be identical to the acidic compound, the absorption liquid and the gas to be used in the gas treatment system illustrated in FIG. 2.

Heat Transfer Apparatus

In the gas treatment system illustrated in FIG. 3, the heat transfer apparatus 5a may include a first liquid recovery heat exchanger HX4, a second liquid recovery heat exchanger HX5, the gas recovery heat exchanger HX2, the output heat exchanger HX3, the heating medium compressor Cx and the expansion valve Vx. The first liquid recovery heat exchanger HX4 is closer to the regenerator 3 than the liquid separator 2 is, and the first liquid recovery heat exchanger HX4 is closer to the absorber 1 than the main heat exchanger 9a on the second flow path L2 is. The first liquid recovery heat exchanger HX4 allows the heating medium to recover heat from the first phase portion of the treatment liquid separated by the liquid separator 2. The second liquid recovery heat exchanger HX5 is disposed on the fourth flow path L4 downstream of the liquid separator 2, and allows the heating medium to recover heat from the second phase portion of the treatment liquid separated by the liquid separator 2. The gas recovery heat exchanger HX2 allows the heating medium to recover heat from the gas having undergone separation of the acidic compound. The output heat exchanger HX3 is disposed on the heating flow path 8, and heats the absorption liquid stored in the regenerator 3 and containing the first phase portion, by using the heating medium. The heating medium compressor Cx compresses the heating medium having recovered heat in the first liquid recovery heat exchanger HX4 and the second liquid recovery heat exchanger HX5. The expansion valve Vx decompresses the heating medium having emitted heat in the output heat exchanger HX3.

The total amount of heat which may be recovered by the first liquid recovery heat exchanger HX4 and the second liquid recovery heat exchanger HX5 in the gas treatment system illustrated in FIG. 3 is approximately equal to the amount of heat recovered by the liquid recovery heat exchanger HX1 in the gas treatment system illustrated in FIG. 3. The energy consumption in the gas treatment system illustrated in FIG. 3 is equivalent to the energy consumption in the gas treatment system illustrated in FIG. 4.

Fourth Embodiment

Figure 4:
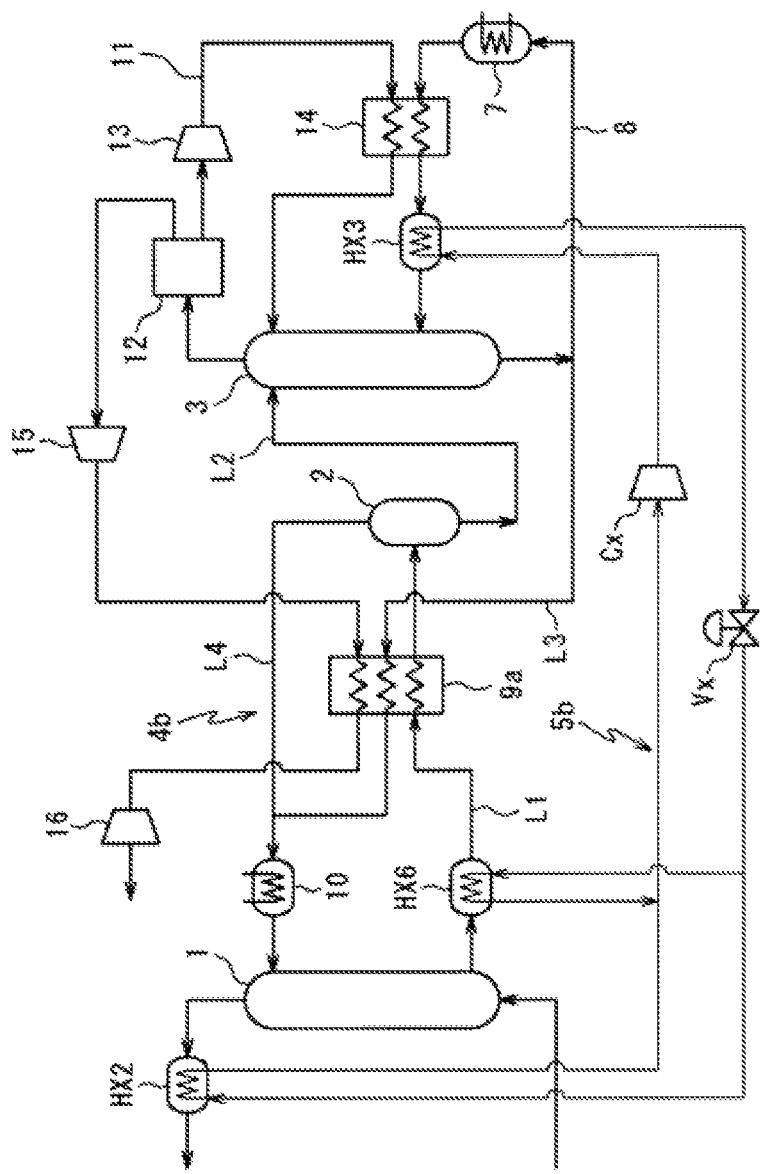
FIG. 4 is a schematic diagram illustrating the configuration of a gas treatment system according to an embodiment of the present invention distinct from the gas treatment systems illustrated in FIGS. 1 to 3.

A gas treatment system illustrated in FIG. 4 is for separating an acidic compound which generates an acid by dissolution in water from a gas containing the acidic compound, by using a treatment liquid capable of absorbing the acidic compound to undergo a phase separation.

The gas treatment system includes the absorber 1, the liquid separator 2, the regenerator 3, a circulation mechanism 4b and a heat transfer apparatus 5b. The absorber 1 contacts the gas with the treatment liquid. The liquid separator 2 separates the treatment liquid into the first phase portion having a high content of the acidic compound and the second phase portion having a low content of the acidic compound. The regenerator 3 eliminates, by heating, the acidic compound from the first phase portion separated by the liquid separator 2. The circulation mechanism 4b recycles the second phase portion separated by the liquid separator 2 and the treatment liquid from which the acidic compound has been eliminated by the regenerator 3, in the absorber 1 as a treatment liquid with which the gas is to be contacted. The heat transfer apparatus 5b transfers heat from the treatment liquid discharged by the absorber 1 and from the gas having undergone separation of the acidic compound, to the treatment liquid in the regenerator 3.

The gas treatment system also includes: the water reflux mechanism 11 for condensing water vapor in the gaseous matter generated by the heating in the regenerator 3, and allowing the resultant water to reflux into the regenerator 3; and the heating flow path 8 provided with the reboiler 7 for heating the absorption liquid stored in the regenerator 3.

The water reflux mechanism 11 includes: the water vapor separator 12 for separating the gaseous matter generated in the generator 3 into water vapor and an acidic compound gas; the water vapor compressor 13 for compressing the water vapor separated by the water vapor separator 12; and the condenser 14 for exchanging heat between the water vapor compressed by the water vapor compressor 13 and the treatment liquid in the regenerator 3 (the heating flow path 8), and allowing the resultant water to reflux into the regenerator 3.

The gas treatment system also includes: the gas compressor 15 for compressing the acidic compound gas emitted by the regenerator 3 and separated by the water vapor separator 12; and the expander 16 for converting the expansive power of the acidic compound gas into rotational energy.

The configurations of the absorber 1, the liquid separator 2, the regenerator 3, the reboiler 7, the water reflux mechanism 11, the gas compressor 15 and the expander 16 of the gas treatment system illustrated in FIG. 4 are identical to the configurations of the absorber 1, the liquid separator 2, the regenerator 3, the reboiler 7, the water reflux mechanism 11, the gas compressor 15 and the expander 16 of the gas treatment system illustrated in FIG. 2. Thus, the constituent elements of the gas treatment system illustrated in FIG. 4 which are equivalent to those of the constituent elements of the gas treatment system illustrated in FIG. 2 are denoted by the same reference signs, and the description thereof will not be repeated. The acidic compound, the absorption liquid and the gas to be used in the gas treatment system illustrated in FIG. 4 may be identical to the acidic compound, the absorption liquid and the gas to be used in the gas treatment system illustrated in FIG. 2.

Circulation Mechanism

The circulation mechanism 4b of the gas treatment system includes the first flow path L1, the second flow path L2, the third flow path L3, and the fourth flow path L4. Through the first flow path L1, the absorption liquid is extracted from the absorber 1 and the extracted absorption liquid is supplied to the liquid separator 2. Through the second flow path L2, the first phase portion separated by the liquid separator 2 is supplied to the regenerator 3. Through the third flow path L3, the treatment liquid is allowed to reflux from the regenerator 3 into the absorber 1. Through the fourth flow path L4, the second phase portion separated by the liquid separator 2 is introduced to the third flow path L3 such that the second phase portion is allowed to reflux into the absorber 1.

The circulation mechanism 4b extends over the first flow path L1 and the third flow path L3, and allows heat to be exchanged between the treatment liquid discharged by the absorber 1 and the treatment liquid from which the acidic compound has been eliminated in the regenerator 3. The circulation mechanism 4b includes the main heat exchanger 9a, which is a three-fluid heat exchanger, to allow heat to be also exchanged between the treatment liquid discharged by the absorber 1 and the acidic compound gas compressed by the gas compressor 15.

Furthermore, the circulation mechanism 4b includes the absorption liquid cooler 10, which is disposed downstream of the point at which the fourth flow path L4 is connected to the third flow path L3 (is disposed close to the absorber 1), for cooling the treatment liquid passing therethrough.

Heat Transfer Apparatus

The heat transfer apparatus 5b may include the liquid recovery heat exchanger HX6, the gas recovery heat exchanger HX2, the output heat exchanger HX3, the heating medium compressor Cx and the expansion valve Vx. The liquid recovery heat exchanger HX6 is disposed on the first flow path L1 so as to be closer to the absorber 1 than the main heat exchanger 9a is, and allows the heating medium to recover heat from the treatment liquid discharged by the absorber 1. The gas recovery heat exchanger HX2 allows the heating medium to recover heat from the gas having undergone separation of the acidic compound. The output heat exchanger HX3 is disposed on the heating flow path 8, and heats the absorption liquid stored in the regenerator 3 and containing the first phase portion, by using the heating medium. The heating medium compressor Cx compresses the heating medium having recovered heat in the liquid recovery heat exchanger HX6 and the gas recovery heat exchanger HX2. The expansion valve Vx decompresses the heating medium having emitted heat in the output heat exchanger HX3.

The amount of heat which may be recovered by the liquid recovery heat exchanger HX6 in the gas treatment system illustrated in FIG. 4 is approximately equal to the amount of heat recovered by the liquid recovery heat exchanger HX1 in the gas treatment system illustrated in FIG. 1.

Fifth Embodiment

Figure 5:
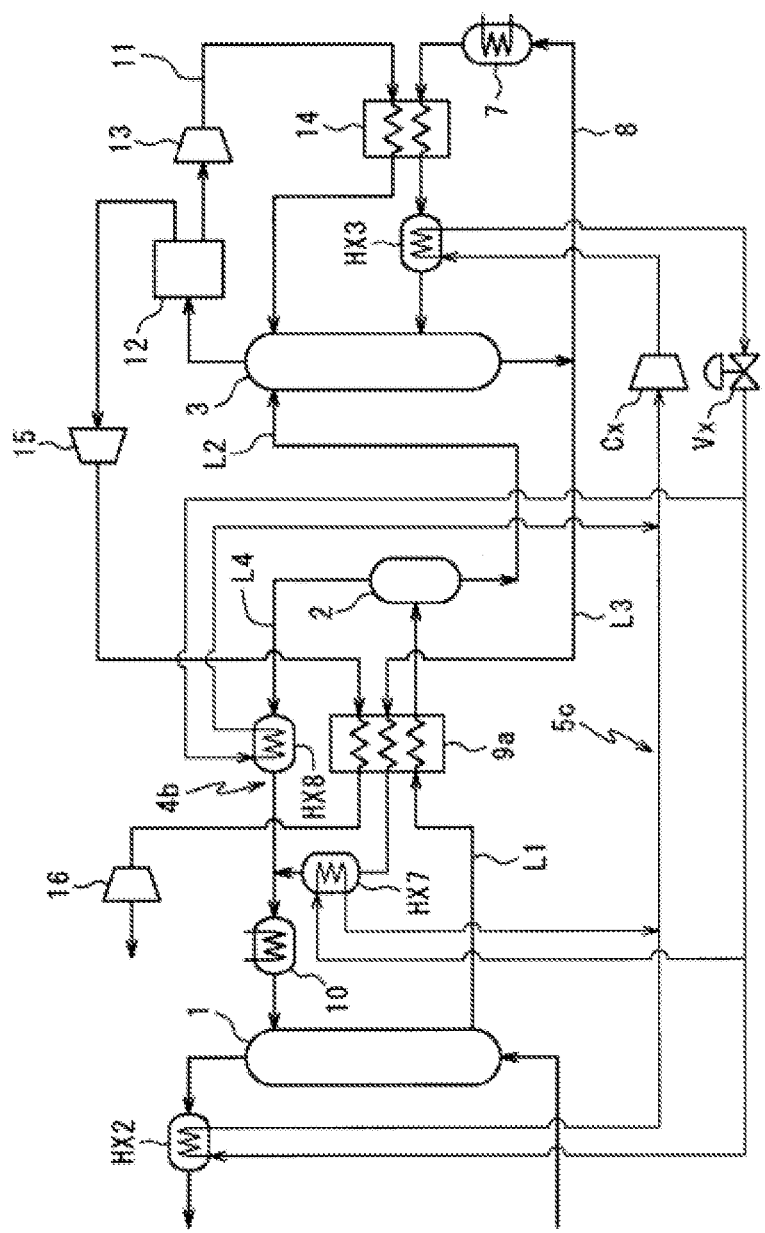
FIG. 5 is a schematic diagram illustrating the configuration of a gas treatment system according to an embodiment of the present invention distinct from the gas treatment systems illustrated in FIGS. 1 to 4.

A gas treatment system illustrated in FIG. 5 is for separating an acidic compound which generates an acid by dissolution in water from a gas containing the acidic compound, by using a treatment liquid capable of absorbing the acidic compound to undergo a phase separation.

The gas treatment system includes the absorber 1, the liquid separator 2, the regenerator 3, the circulation mechanism 4b and a heat transfer apparatus 5c. The absorber 1 contacts the gas with the treatment liquid. The liquid separator 2 separates the treatment liquid into the first phase portion having a high content of the acidic compound and the second phase portion having a low content of the acidic compound. The regenerator 3 eliminates, by heating, the acidic compound from the first phase portion separated by the liquid separator 2. The circulation mechanism 4b recycles the second phase portion separated by the liquid separator 2 and the treatment liquid from which the acidic compound has been eliminated by the regenerator 3, in the absorber 1 as a treatment liquid with which the gas is to be contacted. The heat transfer apparatus 5c transfers heat from the treatment liquid discharged by the absorber 1 and from the gas having undergone separation of the acidic compound, to the treatment liquid in the regenerator 3.

The gas treatment system also includes: the water reflux mechanism 11 for condensing water vapor in the gaseous matter generated by the heating in the regenerator 3, and allowing the resultant water to reflux into the regenerator 3; and the heating flow path 8 provided with the reboiler 7 for heating the absorption liquid stored in the regenerator 3.

The water reflux mechanism 11 includes: the water vapor separator 12 for separating the gaseous matter generated in the generator 3 into water vapor and an acidic compound gas; the water vapor compressor 13 for compressing the water vapor separated by the water vapor separator 12; and the condenser 14 for exchanging heat between the water vapor compressed by the water vapor compressor 13 and the treatment liquid in the regenerator 3 (the heating flow path 8), and allowing the resultant water to reflux into the regenerator 3.

The gas treatment system also includes: the gas compressor 15 for compressing the acidic compound gas emitted by the regenerator 3 and separated by the water vapor separator 12; and the expander 16 for converting the expansive power of the acidic compound gas into rotational energy.

The configurations of the absorber 1, the liquid separator 2, the regenerator 3, the circulation mechanism 4b, the reboiler 7, the water reflux mechanism 11, the gas compressor 15 and the expander 16 of the gas treatment system illustrated in FIG. 5 are identical to the configurations of the absorber 1, the liquid separator 2, the regenerator 3, the circulation mechanism 4b, the reboiler 7, the water reflux mechanism 11, the gas compressor 15 and the expander 16 of the gas treatment system illustrated in FIG. 4. Thus, the constituent elements of the gas treatment system illustrated in FIG. 5 which are equivalent to those of the constituent elements of the gas treatment system illustrated in FIG. 4 are denoted by the same reference signs, and the description thereof will not be repeated. The acidic compound, the absorption liquid and the gas to be used in the gas treatment system illustrated in FIG. 5 may be identical to the acidic compound, the absorption liquid and the gas to be used in the gas treatment system illustrated in FIG. 2.

Heat Transfer Apparatus

The heat transfer apparatus 5c may include a first liquid recovery heat exchanger HX7, a second liquid recovery heat exchanger HX8, the gas recovery heat exchanger HX2, the output heat exchanger HX3, the heating medium compressor Cx and the expansion valve Vx. The first liquid recovery heat exchanger HX7 is disposed on the third flow path L3 so as to be closer to the absorber 1 than the main heat exchanger 9a is, and allows the heating medium to recover heat from the treatment liquid. The second liquid recovery heat exchanger HX8 is disposed on the fourth flow path L4, and allows heat recovery from the second phase portion of the treatment liquid separated by the liquid separator 2. The gas recovery heat exchanger HX2 allows the heating medium to recover heat from the gas having undergone separation of the acidic compound. The output heat exchanger HX3 is disposed on the heating flow path 8, and heats the absorption liquid stored in the regenerator 3 and containing the first phase portion, by using the heating medium. The heating medium compressor Cx compresses the heating medium having recovered heat in the first liquid recovery heat exchanger HX7, the second liquid recovery heat exchanger HX8 and the gas recovery heat exchanger HX2. The expansion valve Vx decompresses the heating medium having emitted heat in the output heat exchanger HX3.

Other Embodiments

The above-described embodiments do not limit the configuration of the present invention. Therefore, constituent elements of each part of the above-described embodiments may be omitted, replaced or added based on the description in the present specification and the common technical knowledge, and such omission, replacement and addition should be construed as falling within the scope of the present invention.

The gas treatment system may be any system as long as it includes a heat transfer apparatus for transferring heat from the treatment liquid discharged by the absorber and from the gas having undergone separation of the acidic compound, to the treatment liquid in the regenerator. The heat recovery by the heat transfer apparatus may be optionally combined with any heat recovery from the acidic compound gas emitted by the regenerator and from water vapor.

The gas treatment system may include a plurality of heat transfer apparatuses, i.e., a heat transfer apparatus for recovering heat from the treatment liquid discharged by the absorber, and a heat transfer apparatus for recovering heat from the gas having undergone separation of the acidic compound.

In the gas treatment system, the output heat exchanger, the reboiler and the condenser of the heat transfer apparatus may be placed in a freely selected layout, and may be arranged in parallel, not in series. The output heat exchanger, the reboiler and the condenser may be located in the regenerator.

The gas treatment system may also include an expander for converting thermal energy remaining in the gas having undergone the heat recovery by the heat transfer apparatus into power and recovering the power.

INDUSTRIAL APPLICABILITY

The gas treatment system of the present invention can be suitably used for separation of acidic compounds from various types of gases, in particular, separation of carbon dioxide from the gases.

The present application claims priority to Japanese Patent Application No. 2015-163867, filed on Aug. 21, 2015, and the contents of which are incorporated herein by reference in their entirety.

EXPLANATION OF THE REFERENCE SYMBOLS 1 absorber
liquid separator
regenerator
4, 4a, 4b circulation mechanism
5, 5a, 5b, 5c heat transfer apparatus
6 condenser
7 reboiler
8 heating flow path
9, 9a main heat exchanger
10 absorption liquid cooler
11 water reflux mechanism
12 water vapor separator
13 water vapor compressor
14 condenser
15 gas compressor
16 expander
L1 first flow path L2 second flow path
L3 third flow path
L4 fourth flow path
HX1, HX4, HX5, HX6, HX7, HX8 liquid recovery heat exchanger
HX2 gas recovery heat exchanger
HX3 output heat exchanger
Cx heating medium compressor
Vx expansion valve

The invention claimed is:

1. A gas treatment system for separating an acidic compound which generates an acid by dissolution in water from a gas containing the acidic compound, by using a treatment liquid capable of absorbing the acidic compound to undergo a phase separation, the gas treatment system comprising:
   an absorber for contacting the gas with the treatment liquid;
   a liquid separator for separating the treatment liquid having been in contact with the gas into a first phase portion having a high content of the acidic compound and a second phase portion having a low content of the acidic compound;
   a regenerator for heating the first phase portion separated by the liquid separator to eliminate the acidic compound from the first phase portion;
   a circulation mechanism for recycling the second phase portion separated by the liquid separator and the treatment liquid from which the acidic compound has been eliminated by the regenerator, in the absorber as a treatment liquid with which the gas is to be contacted; and
   a heat transfer apparatus for transferring heat from the treatment liquid discharged by the absorber and from the gas having undergone separation of the acidic compound, to the treatment liquid in the regenerator.

2. The gas treatment system according to claim 1, further comprising a water reflux mechanism which comprises:
   a water vapor separator for separating a gaseous matter generated by the heating in the regenerator, into water vapor and an acidic compound gas;
   a water vapor compressor for compressing the water vapor separated by the water vapor separator; and
   a condenser for exchanging heat between the water vapor compressed by the water vapor compressor and the treatment liquid in the regenerator,
   wherein the water reflux mechanism allows the water condensed by the condenser to reflux into the regenerator.

3. The gas treatment system according to claim 1, wherein the circulation mechanism comprises a heat exchanger for exchanging heat between the first phase portion separated by the liquid separator and the treatment liquid from which the acidic compound has been eliminated in the regenerator.

4. The gas treatment system according to claim 2, wherein the circulation mechanism comprises a heat exchanger for exchanging heat between the first phase portion separated by the liquid separator and the treatment liquid from which the acidic compound has been eliminated in the regenerator.

5. The gas treatment system according to claim 3, further comprising a gas compressor for compressing the acidic compound gas emitted by the regenerator,
   wherein the heat exchanger is a three-fluid heat exchanger for exchanging heat between the acidic compound gas compressed by the gas compressor, and both the treatment liquid discharged by the absorber and the first phase portion separated by the liquid separator.

6. The gas treatment system according to claim 1, wherein the heat transfer apparatus transfers heat from the absorption liquid before the absorption liquid is separated by the liquid separator.

7. The gas treatment system according to claim 1, wherein the heat transfer apparatus transfers heat from the first phase portion and the second phase portion separated by the liquid separator.

8. A gas treatment method comprising:
   contacting a gas comprising an acidic compound which generates an acid by dissolution in water, with a treatment liquid capable of absorbing the acidic compound to undergo a phase separation;
   separating the treatment liquid having been in contact with the gas into a first phase portion having a high content of the acidic compound and a second phase portion having a low content of the acidic compound;
   heating the first phase portion to eliminate the acidic compound from the first phase portion;
   recycling the second phase portion and the treatment liquid from which the acidic compound has been eliminated, as a treatment liquid with which the gas is to be contacted in the contacting; and
   transferring by a heat transfer apparatus heat recovered from the treatment liquid having been in contact with the gas, and heat recovered from the gas having undergone separation of the acidic compound, in order to heat the first phase portion.

* * * * *